| United States Patent [19] | [11] Patent Number: 4,553,413 |
|---|---|
| Genji et al. | [45] Date of Patent: Nov. 19, 1985 |

[54] WASHING MACHINE

[75] Inventors: Nobuo Genji, Osaka; Wataru Takahashi, Amagasaki; Masatatsu Nakamura, Osaka; Yoichi Kawai, Neyagawa, all of Japan

[73] Assignee: Matsushita Electric Industrial Co., Ltd., Kadoma, Japan

[21] Appl. No.: 574,103

[22] PCT Filed: May 10, 1983

[86] PCT No.: PCT/JP83/00140

§ 371 Date: Jan. 3, 1984

§ 102(e) Date: Jan. 3, 1984

[87] PCT Pub. No.: WO83/04058

PCT Pub. Date: Nov. 24, 1983

[30] Foreign Application Priority Data

May 10, 1982 [JP] Japan .................................. 57-78936
May 10, 1982 [JP] Japan .................................. 57-78952
Jan. 4, 1983 [JP] Japan .................................. 58-330

[51] Int. Cl.4 ............................................. D06F 33/02
[52] U.S. Cl. ................................................... 68/12 R
[58] Field of Search ........................................ 68/12 R

[56] References Cited

U.S. PATENT DOCUMENTS

| 2,210,859 | 8/1940 | Davis | 366/142 |
| 3,359,766 | 12/1967 | Haas | 68/12 R X |
| 3,470,718 | 10/1969 | Scourtas | 68/12 R |
| 4,235,085 | 11/1980 | Torita | 68/12 R |
| 4,400,838 | 8/1983 | Steers et al. | 68/12 R X |

FOREIGN PATENT DOCUMENTS

| 32971 | 3/1978 | Japan | 68/12 R |
| 32976 | 3/1978 | Japan | 68/12 R |
| 35272 | 4/1978 | Japan | 68/12 R |
| 47894 | 4/1980 | Japan . | |
| 66390 | 5/1980 | Japan . | |

Primary Examiner—Philip R. Coe
Assistant Examiner—Frankie L. Stinson
Attorney, Agent, or Firm—Wenderoth, Lind & Ponack

[57] ABSTRACT

The present invention is designed to detect instantaneous variations in the current flowing through a motor (5), instantaneous variations in the rotation of an agitating body (4), or instantaneous variations in the rotation of the motor (5) to thereby detect the washing load size. On the basis of the detection signal, the washing process is controlled to make it possible to properly set the washing bath ratio, detergent concentration, washing time, and number of revolutions of the fabrics being washed.

9 Claims, 16 Drawing Figures

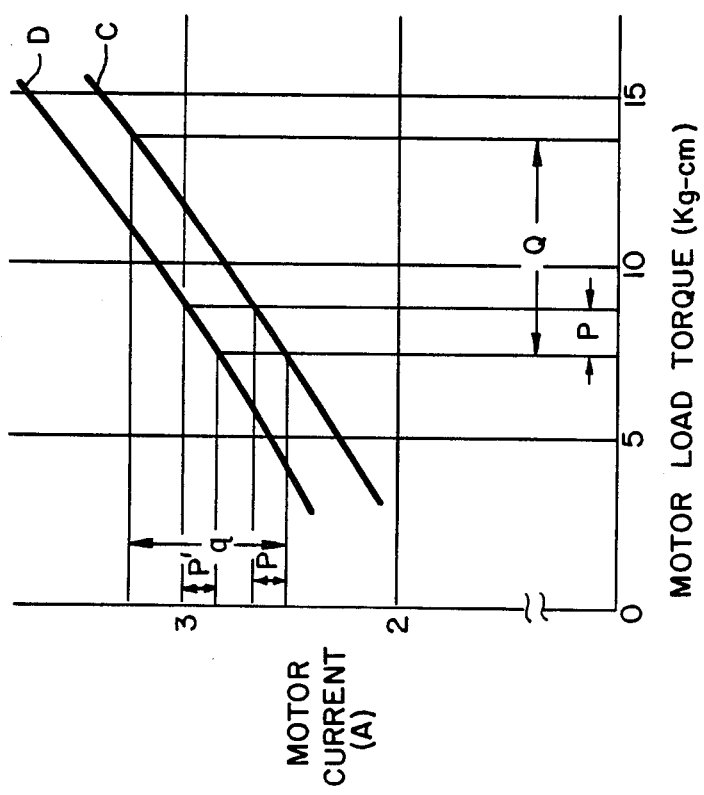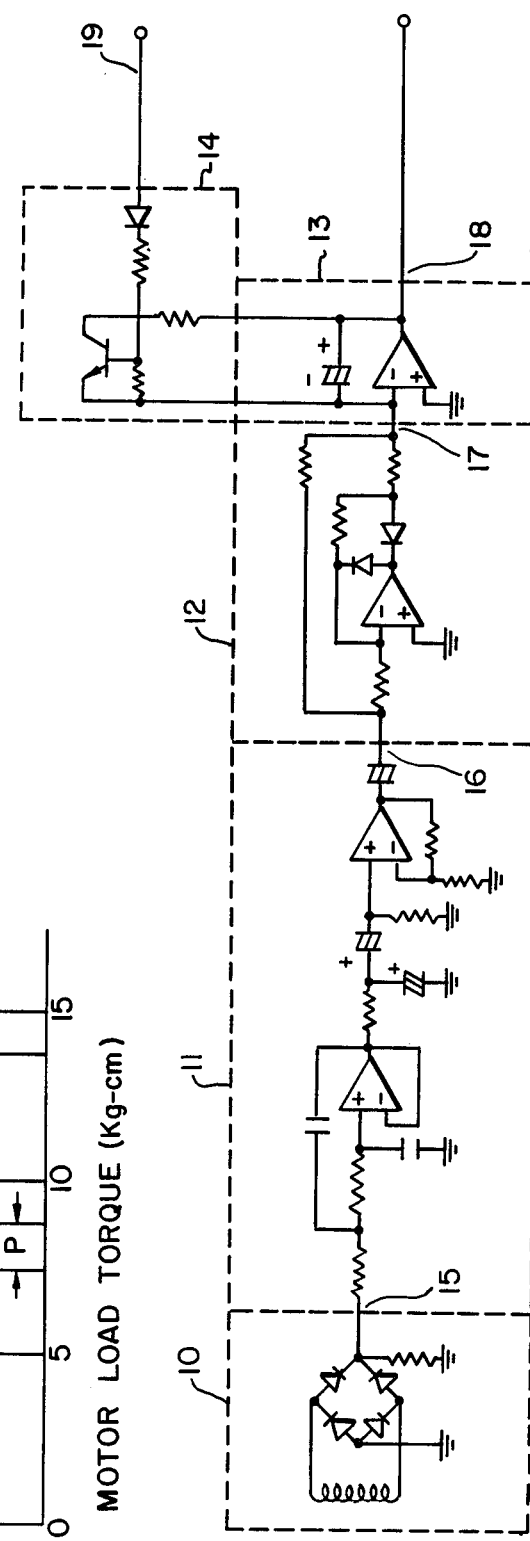

WASHING MACHINE

TECHNICAL FIELD

The present invention relates to a washing machine adapted to detect the washing load size to control factors in the washing process in accordance with the washing load size, which factors include the washing bath ratio, the amount of the detergent, and the number of revolutions of the fabric articles being washed.

BACKGROUND ART

Heretofore, various types of washing load size detecting devices for washing machines have been proposed but have presented many difficult problems.

For example, in a washing machine of the pulsator (agitator vane wheel) type in which the fabric articles, particulary clothes, are agitated, there is a type making use of the fact that the rise time required for the pulsator to reach a predetermined rpm varies with the washing load size.

Generally, it has already been known that in the condition in which the clothes are agitated in the washing tub by the pulsator, the load on the pulsator varies to a large extent with various conditions such as the material and shape of the clothes, the degree of entanglement of the clothes put in the washing machine, and the water absorbency of the clothes. Therefore, before the load on the pulsator can be related to the washing load size, agitation must be effected until the aforesaid conditions reach equilibrium, it being necessary to take measurements during the agitation.

On the other hand, the rise time required for the pulsator to reach a predetermined rpm is so short that a single measurement of the rise time of the pulsator is not sufficient to detect the washing load size; thus, a plurality of measurements are required. Therefore, the number of stops of pulsator rotation increases, a fact which is liable to cause damage to the fabrics of the articles being washed depending upon the washing bath ratio. Further, because the measurement is allowed only for a short time, as described above, the accuracy of detection of the washing load size is very low.

There is another type making use of the fact that the average values of the pulsator rpm, the rpm of the motor driving the pulsator, and the current through said motor each correspond to the washing load size; when the washing load size increases, the average rpm decreases and the average current increases.

It is a matter of course that the rpm or current of the motor varies with the load, but it also varies with other factors than the load, such as the motor supply voltage, motor core or winding temperature, and differences in the characteristics of individual motors; thus a judgement for distingishing between a motor load variation and a variation due to external causes, a correction therfore, or stabilization of the voltage is required, so that the arrangement becmes complicated.

On the other hand, the absolute value of the variation due to the motor load is very small as compared with the absolute value of the variation under no motor load, and the accuracy of detection of the washing load size is not good.

FIG. 1 shows the relation between the washing load size and the average of motor current. The character A designates the curve where the motor temperature is 25° C. and B the curve where the motor temperature is 70° C. As is clear from FIG. 1, it is difficult to detect an increase in the motor current due to an increase in the washing load size without the detection being influenced by the temperature.

DISCLOSURE OF THE INVENTION

The present invention provides a washing machine adapted to detect the washing load size in terms of instantaneous variations in such values as the rpm of the agitator and motor current by making use of the fact that the motor load acts discontinuously and instantaneously owing to the movement of the washing load in the washing machine toward and away from the agitator, the size of the resulting detection signal being utilized to control the washing process, making it possible to properly set the washing bath ratio, detergent concentration, washing time, and agitator drive period.

BRIEF DESCRIPTION OF DRAWINGS

FIG. 4 is a graph showing the relation between motor load torque and motor current;

FIG. 5 is a circuit diagram of a washing load size detecting device in an embodiment of the present invention;

BEST MODE OF CARRYING OUT THE INVENTION

Figure 1:
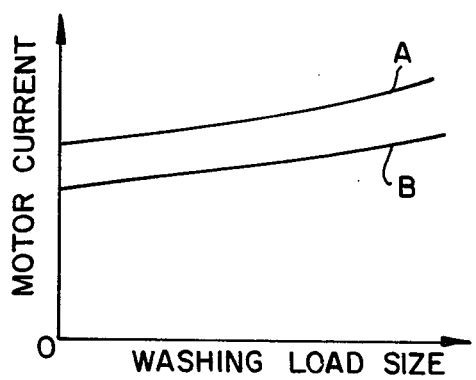
FIG. 1 is a graph showing the relation between the washing load size and the motor current.
Figure 2:
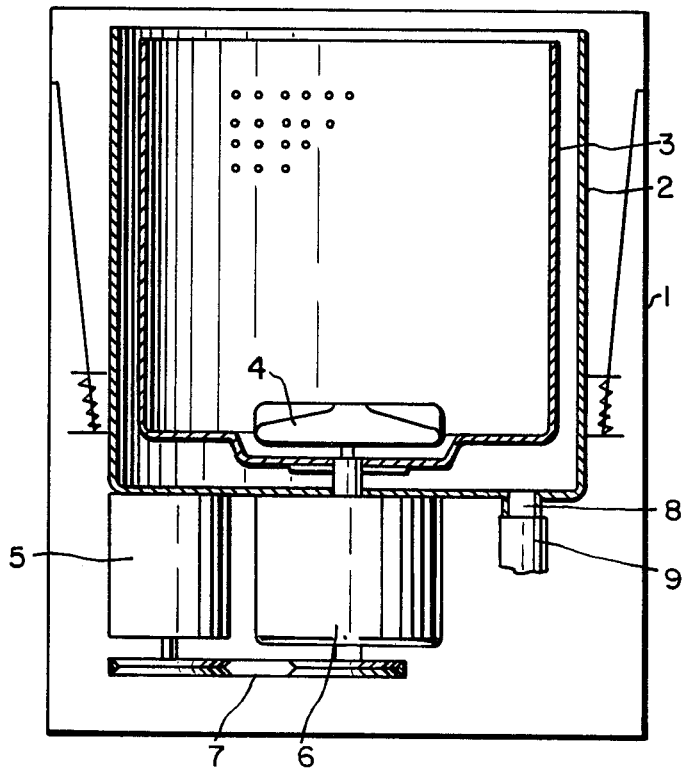
FIG. 2 is a schematic sectional view of the washing machine according to an embodiment of the present invention.

Embodiments of the invention will now be described. FIG. 2 shows the schematic arrangement of a dehydrating and washing machine. The numeral 1 denotes a body; 2 denotes an outer tub antivibration-wise suspended within said body; 3 denotes a dehydrating and washing tub (hereinafter referred to simply as the washing tub) mounted for rotation inside the outer tub; 4 denotes an agitating vane wheel disposed in the bottom of the washing tub 4; and 5 denotes a motor whose torque is transmitted either to the agitating vane wheel 4 or to the washing tub 3 by the switching action of a clutch mechanism 6. The numeral 7 denotes a belt for transmitting the torque of the motor 5 to the clutch mechanism 6; 8 denotes a drain port; and 9 denotes a drain hose.

The general operation of the washing machine of the above arrangement is well known and hence it will not be described in detail. The following description is directed to the load on the agitating vane wheel 4.

Figure 3A:
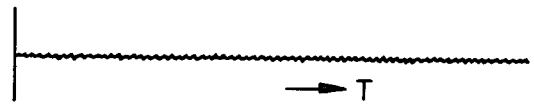
FIGS. 3a-3c show shows time-dependent variations in the average value of the torque on the agitator according to accordance with the washing load size.
Figure 3B:
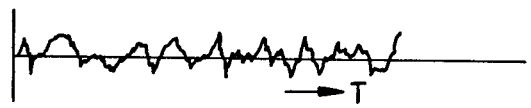
Figure 3C:
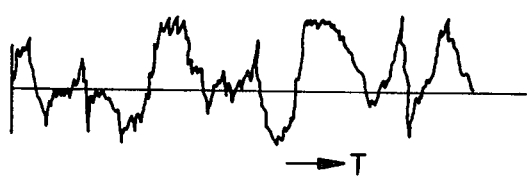

In FIGS. 3a-3c, the horizontal axis represents time T and the vertical axis represents variations in torque on the agitating vane wheel 4, the centerline representing the average value. FIG. 3a refers to a case where no washing load is put in the washing tub 3 and only water contained therein. FIG. 3b refers to a case where a washing load weighing 1 kg is put in the same amount of water as in the case of FIG. 3a; FIG. 3c refers to a case where a washing load of 2 kg is put in the same amount of water.

The variation occurs because the torque increases the instant the washing load strikes against the agitating vane wheel and it decreases the instant the washing load leaves said wheel. In the case of FIG. 3c, because of the greater washing load size, the variation due to the washing load striking against and leaving said wheel extends over a wide range.

FIG. 4 is a graph showing the relation between motor load torque and motor current. In the case of the curve C, the motor temperature is 25° C., at the rated voltage. When the load torque varies within the range P, the current varies within the range P, but the current varies within the range q when the load torque variation range changes to Q as the washing load size is increased. When the source voltage increases to change the torque versus current curve to D, the gradient of the curve remains almost unchanged, so that for the load torque variation range P, the motor current variation range is p', which is almost the same as p. This is also true with variations in motor current or in the characteristics of motors as well as source voltage variation.

FIG. 5 shows a washing load size detecting device adapted to detect instantaneous variations in motor current and integrate the same to provide output. In FIG. 5, 10 denotes motor current detecting means comprising a combination of a current transformer, a diode bridge, and a resistor, for example; 11 denotes a band pass filter allowing instantaneous variations in current to pass therethrough excluding the dc component and the commercial source voltage frequency component of the output of said motor current detecting means 10; 12 denotes rectifying means for amplifying the output of said band pass filter and full-wave rectifying the same; 13 denotes integrating means for integrating the output of said rectifying means 12 for a fixed time; and 14 denotes timing means for providing the integration time for said integrating means 13 and providing a signal to zero the output value.

Figure 6:
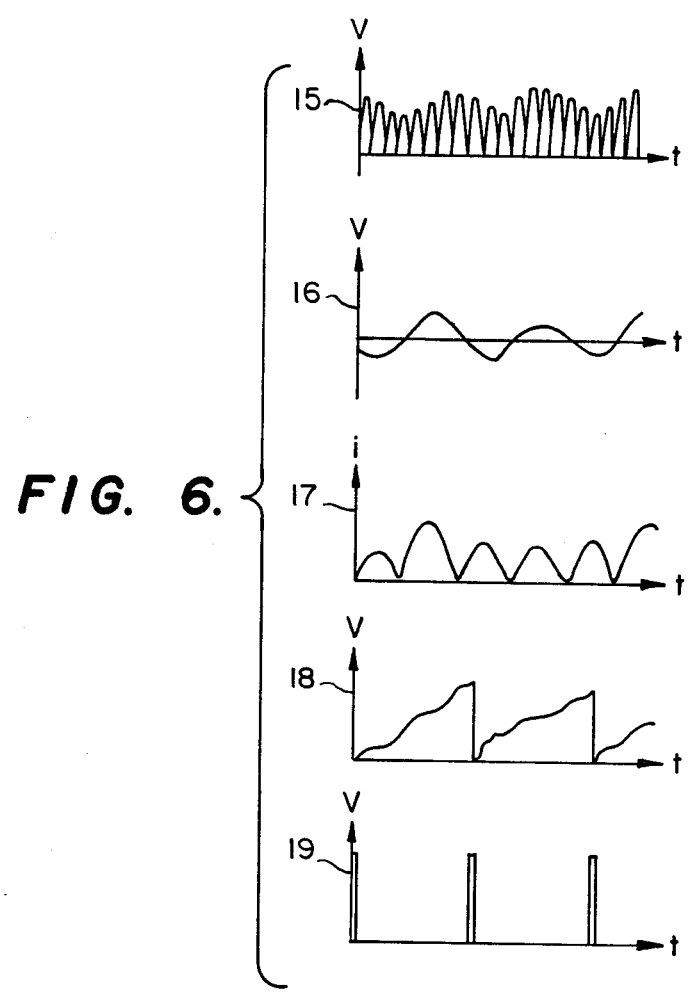
FIG. 6 shows signal waveforms in various portions of the electric circuit shown in FIG. 5.

As regards the washing load size detecting device constructed in the manner described above, output signal waveforms for individual blocks are shown in FIG. 6. The numeral 15 denotes the output waveform of said motor current detecting means 10, wherein instantaneous current variations caused by the washing load moving to and away from the agitating vane wheel are superposed on the full-wave rectified commercial power source. The numeral 16 denotes the output waveform of said band pass filter 11, showing the dc component and the components above the commercial power source frequency from the input waveform 15, excluded, leaving only the instantaneous variations in motor current outputted. When the agitating vane wheel is rotated with no washing load in the washing machine but with water alone, there is almost no variation in motor load, so that the amplitude is small. However, as the washing load size is increased, the motor load at the instant of the washing load striking against the agitating vane wheel increases and so does the amplitude. The numeral 17 denotes the output current of said rectifying means 12, indicating that a current proportional to the absolute value of the input voltage 16 is taken in. The numeral 19 denotes the output waveform of said timing means 14, indicating that pulse signals to zero the output value of said integrating means are given at intervals of, e.g., 5 seconds. The numeral 18 denotes the output waveform of said integrating means 13, wherein a voltage obtained by integrating the input current 17 is outputted. Further, when a pulse signal 19 is given, the output value returns to zero. This integrated voltage is compared with a threshold voltage to judge the washing load size.

Figure 7:
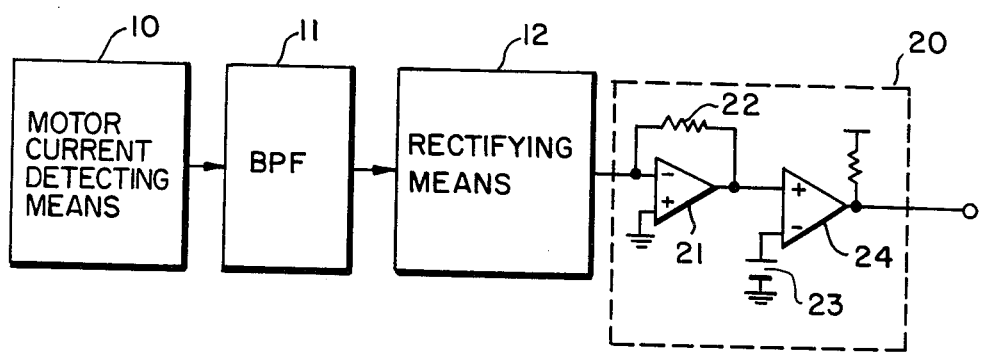
FIG. 7 is an electric circuit diagram of a washing load size detecting device in another embodiment of the invention.
Figure 8B:
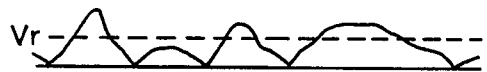
FIGS. 8a-8e show shows signal waveforms in various portions of the electric circuit shown in FIG. 7.
Figure 8D:
Figures 8A, 8C, 8E, 9:
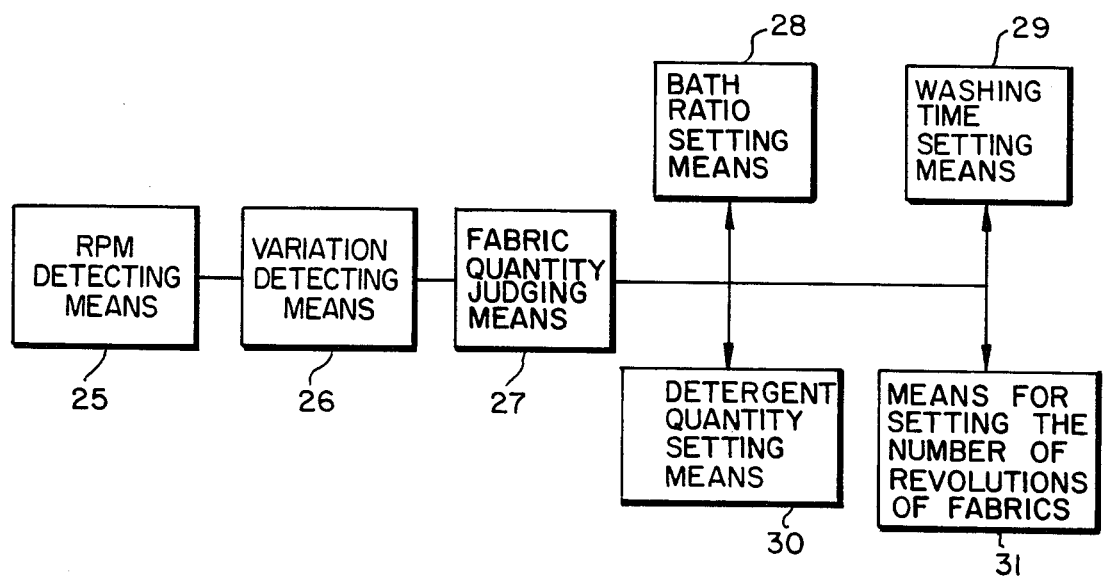
FIG. 9 is a block diagram of a washing machine according to an embodiment of the invention.

FIG. 7 shows a device for detecting the number of times which motor load variations exceed a predetermined level within a preset time. The integrating means 13 and resetting means 14 of FIG. 5 are replaced by a circuit 20. The output current of the rectifying means 12 is changed to a voltage by means of an operational amplifier 21 and a resistor 22. This voltage represents the absolute value of the instantaneous variation in motor current. A comparator 24 judges whether or not this voltage exceeds Vr of a reference voltage 23. FIG. 8a shows a timing signal for sampling. FIG. 8b shows the output voltage waveform of the operational amplifier 21 when the washing load size is medium. FIG. 8c shows the times at which this voltage exceeds Vr at the sampling times in FIG. 8a. FIGS. 8d and 8e are figures similar to FIGS. 8b and 8c for the case where the amount of fabrics is large. It is seen that the number of times with which Vr is exceeded within the same period of time is greater in FIG. 8e. On the basis of this number of times, the washing load size is judged.

FIG. 9 is a block diagram where the washing load size is judged by comparing the maximum value of instantaneous variations in rotation of the agitating vane wheel with a predetermined level. The numeral 25 denotes means for detecting the rpm of the agitating vane wheel 4; 26 denotes means for detecting variations in detected rpm; and 27 denotes fabric quantity judging means for judging the fabric quantity by the variations. These three means constitute washing load size detecting means for detecting variations in the load acting on the agitating vane wheel, i.e., instantaneous values of variations in rotation so as to generate washing load size signals. The numerals 28–31 denotes means for setting suitable bath ratio, detergent quantity, washing time, and number of revolutions of fabrics, respectively, on the basis of said washing load size signal.

Figure 10:
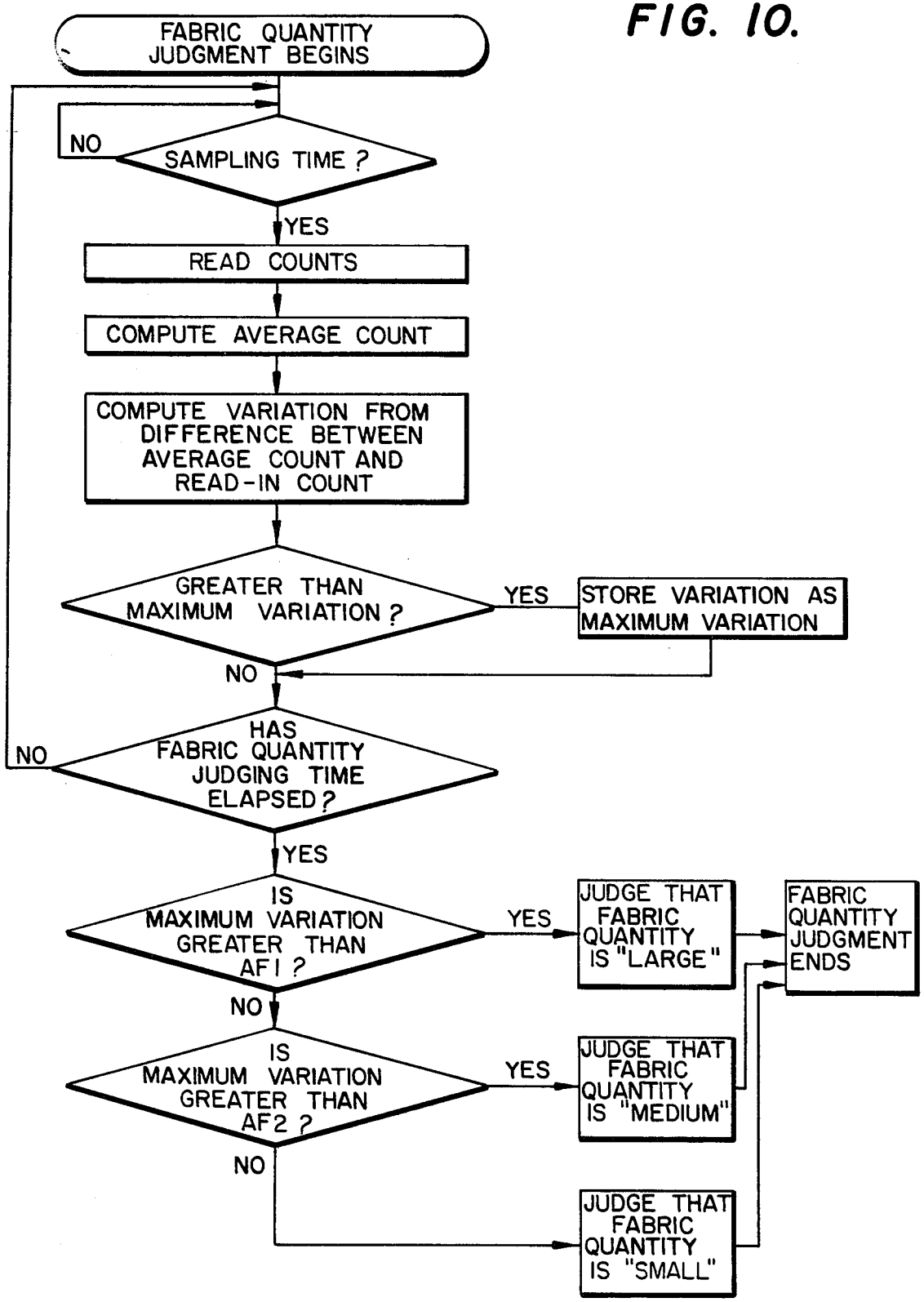
FIG. 10 is a flowchart for operating said washing machine by using a microcomputer.

FIG. 10 shows a flowchart for achieving said rotation variation detecting means 26 and fabric quantity judging means 27 by a microcomputer. In the figure, count values obtained by counting the output of a hole IC at fixed intervals of time are read in and the average count number is computed. Next, the absolute value of the difference between the average count value and a newly read-in count value is computed and if this value is greater than the last maximum value of variation, it is stored. After this has been repeated for a fixed period of time, the fabric quantity is judged by the maximum value of variation.

In addition, while FIG. 10 shows the case where two reference levels are used to judge the washing load size (fabric quantity) in three steps, a finer judgement of the washing load size can be made using the same method if the number of reference levels is increased.

Further, in the case where an ac induction motor is used as the motor 5 for driving the agitating vane wheel 4, by detecting variations in the current phase angle of the ac induction motor or instantaneous variations in voltage on the auxiliary winding of the ac induction motor it is possible to detect instantaneous variations in load on the agitating vane wheel and hence the washing load size can be accurately detected.

In the aforesaid and other embodiments, a washing machine of the whirl type using an agitating vane wheel has been described, but the same function and effects as in the embodiments described above can be attained in other types of washing machines such as the agitation type washing machine adapted to oscillate the agitating vane wheel and the drum type washing machine using a rotary drum rotated to agitate the washing load. In addition, in the drum type washing machine, the rotary drum corresponds to the agitating vane wheel, and the agitating vane wheel and rotary drum may be termed agitating bodies.

While the embodiment refers to a dehydrating and washing machine, the same effects as in this embodiment can be attained in the so-called double tub type washing machine having two tubs arranged side by side.

INDUSTRIAL APPLICABILITY

As has been described so far, the present invention provides washing load size detecting means using as an input an instantaneous value of variation in load on the washing load agitating body to produce a washing load size signal, and control means for controlling the washing process on the basis of said washing load size signal. The washing load size can be accurately detected without being influenced by disturbance, making it possible to finely control the washing bath ratio, detergent quantity, and number of revolutions of fabrics being washed, so that washing performance can be greatly improved.

What is claimed is:

1. A washing machine comprising:
   a washing load agitating body;
   a washing load size detecting means having an instantaneous load variation value detection menas for detecting instantaneous values of variation in the load on said agitating body, and level judging means for judging the levels of said values and having integrating means for integrating said instantaneous values of the variations in the load over predetermined periods of time and comparator means for comparing the integrated values with a predetermined value for producing a washing load size signal; and control means to which said size detecting means is connected for controlling the washing operation of said washing machine in response to said washing load size signals.

2. A washing machine as claimed in claim 1 in which said comparator means comprises means for detecting the maximum value of the variations in the load within a predetermined time, and a comparator for comparing said maximum value with said predetermined value.

3. A washing machine as claimed in claim 1 in which said comparator means comprises means for detecting the number of times said values of variations exceed a predetermined level within a preset time, and a comparator for comparing said number of times with predetermined numbers of times corresponding to desired load sizes.

4. A washing machine as claimed in claim 1 in which said washing machine has an electric motor for driving said agitating body, and said load variation value detection means comprises means for detecting instantaneous variations in the values of current flowing through said motor while driving said agitating body.

5. A washing machine as claimed in claim 1 in which said load variation value detection means comprises means for detecting instantaneous variations in the rotation of said agitating body.

6. A washing machine as claimed in claim 1 in which said washing machine has an electric motor for driving said agitating body and said variation value detection means comprises means for detecting instantaneous variations in the rotation of said motor.

7. A washing machine as claimed in claim 1 in which said washing machine has an AC induction motor for driving said agitating body, and said load variation value detection means comprises means for detecting instantaneous variations in the phase angle of the current flowing through said induction motor while said motor is driving said agitating body.

8. A washing machine as claimed in claim 1 in which said washing machine has an AC induction motor for driving said agitating body, and said load variation value detection means comprises means for detecting instantaneous variations in the voltage on the auxiliary winding of said induction motor while said motor is driving said agitating body.

9. A washing machine as claimed in claim 1 in which said washing machine has an AC induction motor for driving said agitating body, and said load variation value detection means comprises means for detecting instantaneous variations in the power consumption of said induction motor while said motor is driving said agitating body.

* * * * *